(12) United States Patent
van Slingerland et al.

(10) Patent No.: US 8,931,034 B2
(45) Date of Patent: Jan. 6, 2015

(54) SYSTEM, METHOD, AND POLICY ENGINE FOR GRANTING TEMPORARY ACCESS TO ELECTRONIC CONTENT

(75) Inventors: Florin van Slingerland, Etten-Leur (NL); Stefan Burgers, Eindhoven (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 680 days.

(21) Appl. No.: 12/823,304

(22) Filed: Jun. 25, 2010

(65) Prior Publication Data

US 2011/0321132 A1     Dec. 29, 2011

(51) Int. Cl.
| | | |
|---|---|---|
| G06F 17/00 | (2006.01) | |
| H04L 29/08 | (2006.01) | |
| H04L 12/58 | (2006.01) | |
| H04L 29/06 | (2006.01) | |
| H04N 21/254 | (2011.01) | |
| G06F 21/62 | (2013.01) | |
| H04N 21/258 | (2011.01) | |
| H04N 21/4788 | (2011.01) | |

(52) U.S. Cl.
CPC ...... *H04L 63/102* (2013.01); *G06F 2221/2141* (2013.01); *H04L 67/02* (2013.01); *H04L 51/32* (2013.01); *H04N 21/2541* (2013.01); *H04L 63/108* (2013.01); *G06F 21/6218* (2013.01); *H04N 21/25891* (2013.01); *H04L 63/12* (2013.01); *H04N 21/4788* (2013.01); *G06F 2221/2101* (2013.01); *H04L 12/588* (2013.01)
USPC ....... 726/1; 726/4; 709/226; 705/51; 707/740

(58) Field of Classification Search
CPC ..... H04L 12/588; H04L 63/108; H04L 51/32; H04L 63/12; H04L 67/02; H04L 63/102; H04N 21/4788; H04N 21/2541; H04N 21/25891; G06F 21/6218; G06F 2221/2141
USPC ....................... 726/1, 4; 709/226; 705/51, 27; 707/104.1, 740
See application file for complete search history.

(56) References Cited

U.S. PATENT DOCUMENTS

| | | | |
|---|---|---|---|
| 2002/0073033 A1 * | 6/2002 | Sherr et al. ................. | 705/51 |
| 2005/0251555 A1 * | 11/2005 | Little, II ................. | 709/206 |
| 2007/0226169 A1 | 9/2007 | Solyanik | |
| 2008/0134294 A1 | 6/2008 | Mattox | |
| 2008/0154967 A1 * | 6/2008 | Heikes et al. ............. | 707/104.1 |
| 2009/0254456 A1 * | 10/2009 | Sarbaev et al. ............. | 705/27 |
| 2010/0031343 A1 * | 2/2010 | Childress et al. ............. | 726/18 |
| 2011/0072496 A1 * | 3/2011 | Bertin et al. ................. | 726/4 |

FOREIGN PATENT DOCUMENTS

WO    WO-2009/153477 A1    12/2009

* cited by examiner

Primary Examiner — Brian Shaw

(57) ABSTRACT

A system, method, and Policy Engine for granting a first user temporary access to a second user's electronic content. The Policy Engine receives a request originating from the first user to access the second user's content, and retrieves from a relationship database, relationship information regarding a relationship between the two users. If an access rule matching the relationship information is stored in the Policy Engine, the Policy Engine applies the access rule to control access by the first user for a period of time specified in the rule. If an access rule is not stored, the Policy Engine obtains the access rule from the second user. The Policy Engine allows access when the matching rule grants access and the matching rule has not expired, and denies access when there is no matching rule, when the matching rule does not allow access, or when the matching rule has expired.

15 Claims, 3 Drawing Sheets

SYSTEM, METHOD, AND POLICY ENGINE FOR GRANTING TEMPORARY ACCESS TO ELECTRONIC CONTENT

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to information management systems. More particularly, and not by way of limitation, the present invention is directed to a system, method, and policy engine for granting an identified user temporary access to another user's electronic content.

An example of electronic content is social content such as videos, photographs, status messages, and the like which individuals store in online storage facilities. The individual can access his own social content, but others cannot access the content without permission. When an individual desires to share some of his or her social content with others, existing systems grant access on a permanent basis. This is acceptable if the individual desires to share the content between friends and family. However, for other contacts such as business or professional contacts, the individual may not desire to permanently share the content.

SUMMARY

Prior art information management systems and social networks do not have the capability to automatically grant access to protected electronic content on a temporary basis. The present invention solves this problem with a system, method, and policy engine for granting an identified user temporary access to protected electronic content. The permission granted to the identified user, in addition to the time period, also defines the scope of what content he is permitted to access.

In one embodiment, the present invention is directed to a method of granting a first user temporary access to a second user's electronic content. The method includes the steps of receiving by a Policy Engine, a request originating from the first user to access the second user's content; retrieving by the Policy Engine from a relationship database, relationship information regarding a relationship between the first and second users; and applying by the Policy Engine, an access rule matching the relationship information, the access rule specifying a period of time the content is available. When the specified period of time has not expired, the Policy Engine grants the first user temporary access to the second user's content. When the specified period of time has expired, the Policy Engine denies the first user access to the second user's content.

In another embodiment, the present invention is directed to a Policy Engine for controlling access by a first user to a second user's electronic content. The Policy Engine includes a communication unit for receiving a request originating from the first user to access the second user's content; a relationship retrieval unit for retrieving from a relationship database, relationship information regarding a relationship between the first and second users; a matching unit for applying an access rule matching the relationship information, the access rule specifying a period of time the content is available; and a timer for determining whether the specified period of time has expired. When the specified period of time has not expired, the communication unit sends a response toward the first user indicating that the content is available to the first user. When the specified period of time has expired, the communication unit sends a response toward the first user indicating that the content is no longer available.

In another embodiment, the present invention is directed to a system for controlling access by a first user to a second user's electronic social content. The system includes a Social Media Portal (SMP) for providing the first user with access to a social media network; a Policy Engine in communication with the SMP for storing and applying access rules for controlling access to the social content of a plurality of users; and an Active Address Book (AAB) in communication with the Policy Engine for storing relationship information regarding relationships between the plurality of users. The SMP includes means for forwarding to the Policy Engine, a request originating from the first user to access the second user's content. The Policy Engine includes a relationship retrieval unit for retrieving from the AAB, relationship information regarding a relationship between the first and second users; a matching unit for applying an access rule matching the relationship information, the access rule specifying a period of time the content is available; a timer for determining whether the specified period of time has expired; and a communication unit for sending a response to the SMP allowing access when the matching rule grants access and the matching rule has not expired, and for sending a response to the SMP denying access when there is no matching rule, when the matching rule does not allow access, or when the matching rule has expired.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The invention is explained below in the context of a scenario in which an individual tells his customer about his vacation, and the customer wants to see the individual's vacation photographs. The photographs are stored by an online storage service. The individual would like to share the photographs, but does not want to give the customer permanent access to all of his photographs, and would like to grant access for a limited duration. It should be understood that the present invention is not limited to social content such as vacation photographs or to customers only. The inventive concepts can be applied to any kind of protected electronic content and to any kind of contacts and relationships.

Two main scenarios are described herein. Both scenarios assume two users, User-A who wants access to the content, and User-B who is the owner of the content. In a first scenario, both users are online. User-B can directly grant or deny temporary access by defining an access rule; and User-A can directly obtain temporary access to the content. In a second scenario, User-B is not online, and therefore cannot directly grant or deny the requested access.

Figure 1:
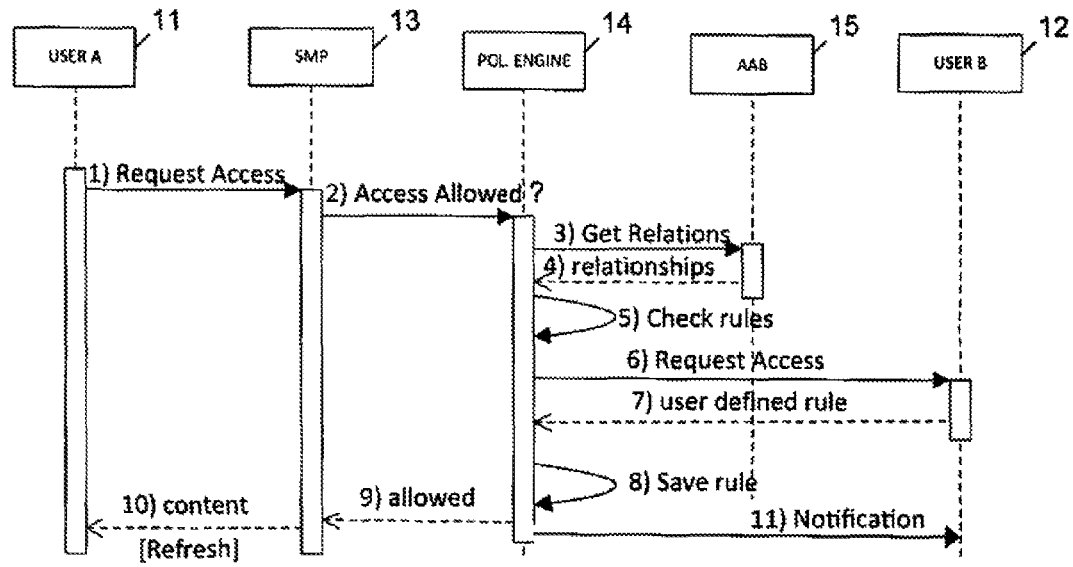
FIG. 1 is a message flow diagram illustrating the flow of messages in a first exemplary embodiment of the method of the present invention.

FIG. 1 is a message flow diagram illustrating the flow of messages in a first exemplary embodiment of the method of the present invention. The figure illustrates User-A 11 and User-B 12 as well as three network nodes referred to as a Social Media Portal (SMP) 13, a Policy Engine 14, and an Active Address Book (AAB) 15. The SMP 13, available from Ericsson, together with an open-standard initiative referred to as "the Pixl8r initiative", offers simplified sharing of user-generated content between users across diverse networks. The Pixl8r initiative is an open-standard solution that enables photo sharing sites to interact in real time. With Pixl8r, mobile users can easily share social media across different operator portals and receive SMS notifications of the activities of other users regardless of the network type. Pixl8r creates a federation of community portals that can connect the world's approximately four billion mobile users. With Ericsson's SMP acting as an access server and browser, users can connect to the social web using any mobile phone. The solution does not require client downloads, and enables posting and accessing of real-time, user-generated content to diverse internet communities. Content is automatically backed up on a community portal that offers personal storage, synchronization, unified messaging, and services for sharing content such as photos and videos with friends and family.

The AAB 15 provides intelligent and automated centralized contact management for mobile users. The AAB enables users to create and publish their personal information to an online address book that automatically updates contact information when a contact in the address book publishes new contact information. Users can search, add, edit, and delete contacts using an AAB web portal. Flexible privacy levels let subscribers decide what information to share and with whom. The AAB works with native address books in existing mobile phones and can support IMS-enabled devices, web, and PC clients. Integrating the AAB with directories, Internet accounts, or social networking sites enables users to search and add more contacts to the address book. The AAB thus provides a relationship database identifying relationships between each pair of users having a record in the AAB.

The Policy Engine 14 retrieves relationships between various users from the MB, and retrieves and stores access rules from each user defining what content is available to other users and for how long the content is available to each user.

At step 1-1, User-A 11 sends a message to the SMP 13 requesting access to User-B's content-X. For example, this may be a friend or customer requesting to see User-B's vacation photographs. At step 1-2, the SMP queries the Policy Engine 14 to determine whether User-A's access to content-X is allowed. The Policy Engine has no relationship information between User-A and User-B, and thus at step 1-3, the Policy Engine contacts the MB 15 to retrieve one or more relationships between User-A and User-B. At step 1-4, the AAB sends the relationships to the Policy Engine.

At step 1-5, the Policy Engine 14 checks a rules database, which may be implemented internally or externally to the Policy Engine, to determine whether there are any access rules matching any of the relationships. In this particular scenario, it is assumed that there are no matching rules. Thus, at step 1-6, the Policy Engine sends an access request message to User-B 12. The access request message includes the relationships between User-A and User-B, and indicates that User-A has requested access to content-X. At step 1-7, User-B provides an access rule to the Policy Engine indicating that User-A is allowed to access content-X for a defined period of time. The access rule may also indicate that this rule applies to other users who have the same relationship to User-B. For example, all of User-B's family members or all of User-B's customers may be granted access to User-B's vacation photographs for a week. At step 1-8, the Policy Engine saves the new access rule in the rules database. At step 1-9, the Policy Engine sends a response to the SMP 13 indicating that User-A is allowed to access content-X. At step 1-10, the SMP returns the requested content-X to User-A. Once access is granted, an application within the SMP 13 may periodically refresh the accessed content and provide it to User-A. Additionally, the Policy Engine 14 may notify User-B that User-A accessed content-X during the defined period of time.

Figure 2:
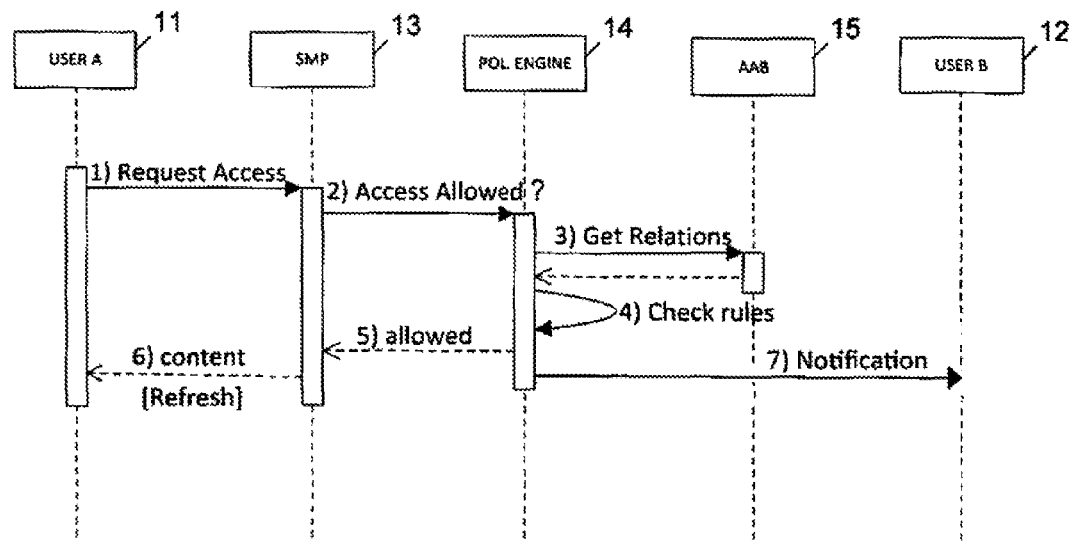
FIG. 2 is a message flow diagram illustrating the flow of messages in a second exemplary embodiment of the method of the present invention.

FIG. 2 is a message flow diagram illustrating the flow of messages in a second exemplary embodiment of the method of the present invention. In this embodiment, an access rule matching the relationship between User-A 11 and User-B 12 is already stored in the rules database. Thus, at step 2-1, User-A sends a message to the SMP 13 requesting access to User-B's content-X. At step 2-2, the SMP queries the Policy Engine 14 to determine whether User-A's access to content-X is allowed. At step 2-3, the Policy Engine contacts the AAB 15 to retrieve one or more relationships between User-A and User-B. At step 2-4, the Policy Engine 14 checks the rules database to determine whether there are any access rules matching any of the relationships. In this particular scenario, it is assumed that there is a matching rule. Thus, at step 2-5, the Policy Engine sends a response to the SMP indicating that User-A is allowed to access content-X. At step 2-6, the SMP returns the requested content-X to User-A. Once again, when access is granted, an application within the SMP 13 may periodically refresh the accessed content and provide it to User-A. Additionally, the Policy Engine 14 may notify User-B that User-A accessed content-X during the time period defined by the rule stored in the rules database.

Figure 3:
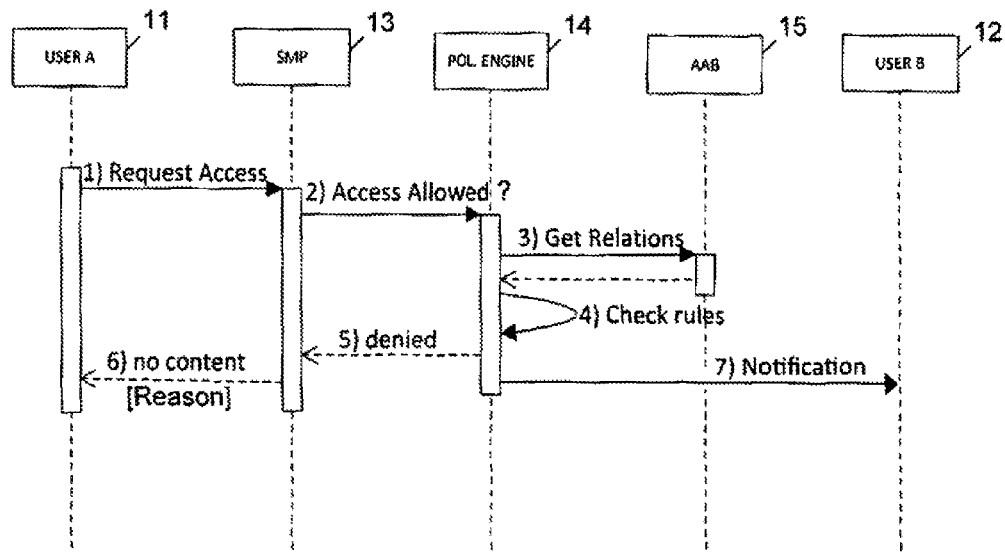
FIG. 3 is a message flow diagram illustrating the flow of messages in a third exemplary embodiment of the method of the present invention.

FIG. 3 is a message flow diagram illustrating the flow of messages in a third exemplary embodiment of the method of the present invention. In this embodiment, a previously stored access rule matching the relationship between User-A 11 and User-B 12 has expired. Thus, at step 3-1, User-A sends a message to the SMP 13 requesting access to User-B's content-X. At step 3-2, the SMP queries the Policy Engine 14 to determine whether User-A's access to content-X is allowed. At step 3-3, the Policy Engine contacts the MB 15 to retrieve one or more relationships between User-A and User-B. At step 3-4, the Policy Engine 14 checks the rules database to determine whether there are any access rules matching any of the relationships. In this, particular scenario, it is assumed that there is a matching rule, but the rule, and thus the authorized time period for access, has expired. Thus, at step 3-5, the Policy Engine sends a response to the SMP indicating that User-A's request to access content-X is denied (due to the expiration of the rule). At step 3-6, the SMP returns no content to User-A, and may notify User-A of a reason for the denial (for example, the access period has expired).

Alternatively, when the rule has expired, the SMP 13 may return a default content screen to User-A 11. The default content screen may be specified by User-B 12 through the rule, or may be preprogrammed in, or determined by, the SMP whenever the Policy Engine 14 denies a request for access. The default content screen may vary depending on the reason for denial. Additionally, the Policy Engine may notify User-B that User-A attempted to access, content-X after expiration of the time period defined by the rule stored in the rules database, and that access was denied.

Figure 4:
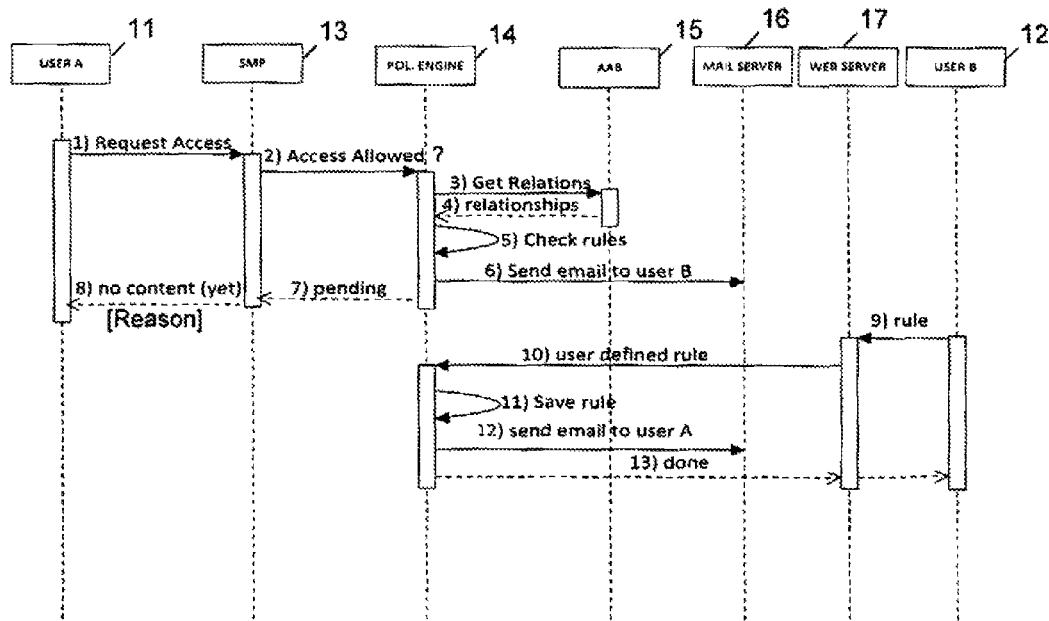
FIG. 4 is a message flow diagram illustrating the flow of messages in a fourth exemplary embodiment of the method of the present invention.

FIG. 4 is a message flow diagram illustrating the flow of messages in a fourth exemplary embodiment of the method of the present invention. In this embodiment, there is no matching rule for the relationship between User-A 11 and User-B 12 stored in the rules database, and User-B is currently off-line. At step 4-1, User-A sends a message to the SMP 13 requesting access to User-B's content-X. At step 4-2, the SMP queries the Policy Engine 14 to determine whether User-A's access to content-X is allowed. The Policy Engine has no relationship information between User-A and User-B, and thus at step 4-3, the Policy Engine contacts the AAB 15 to retrieve one or more relationships between User-A and User-B. At step 4-4, the MB sends the relationships to the Policy Engine.

At step 4-5, the Policy Engine 14 checks the rules database to determine whether there are any access rules matching any of the relationships. In this particular scenario, it is assumed that there are no matching rules. Since User-B is off-line, the Policy Engine sends an e-mail message at step 4-6 to a Mail Server 16 serving User-B 12. The e-mail message includes the relationships between User-A and User-B, and indicates that User-A has requested access to content-X. The e-mail message may also include a link to the Policy Engine with instructions for User-B to click on the link and enter one or more access rules to control User-A's access. Because it may take some period of time before User-B responds to the e-mail message, the Policy Engine indicates to the SMP at step 4-7 that the request is pending. At step 4-8, the SMP indicates to User-A that there is no content available yet, and may provide a reason for the delay. Once again, the SMP 13 may return a default content screen to User-A. The default content screen may be specified by User-B through the rule, or may be preprogrammed in, or determined by, the SMP whenever the Policy Engine indicates there will be a delay processing the request for access.

At step 4-9, User-B 12 responds to the e-mail message (for example by clicking on the link) and provides an access rule indicating that User-A is allowed to access content-X for a defined period of time. The access rule may also indicate that this rule applies to other users who have the same relationship to User-B. At step 4-10, a Web Server 17 serving User-B forwards the access rule to the Policy Engine 14. At step 4-11, the Policy Engine saves the rule in the rules database. At step 12, the Policy Engine sends an e-mail message to the Mail Server 16 for delivery to User-A indicating that User-B has granted/denied User-A access to content-X for a specified time period. Within the specified time period, User-A can then request access and view the content-X. At step 4-13, the Policy Engine indicates to User-B via the Web Server that the access rule has been created.

Figure 5:
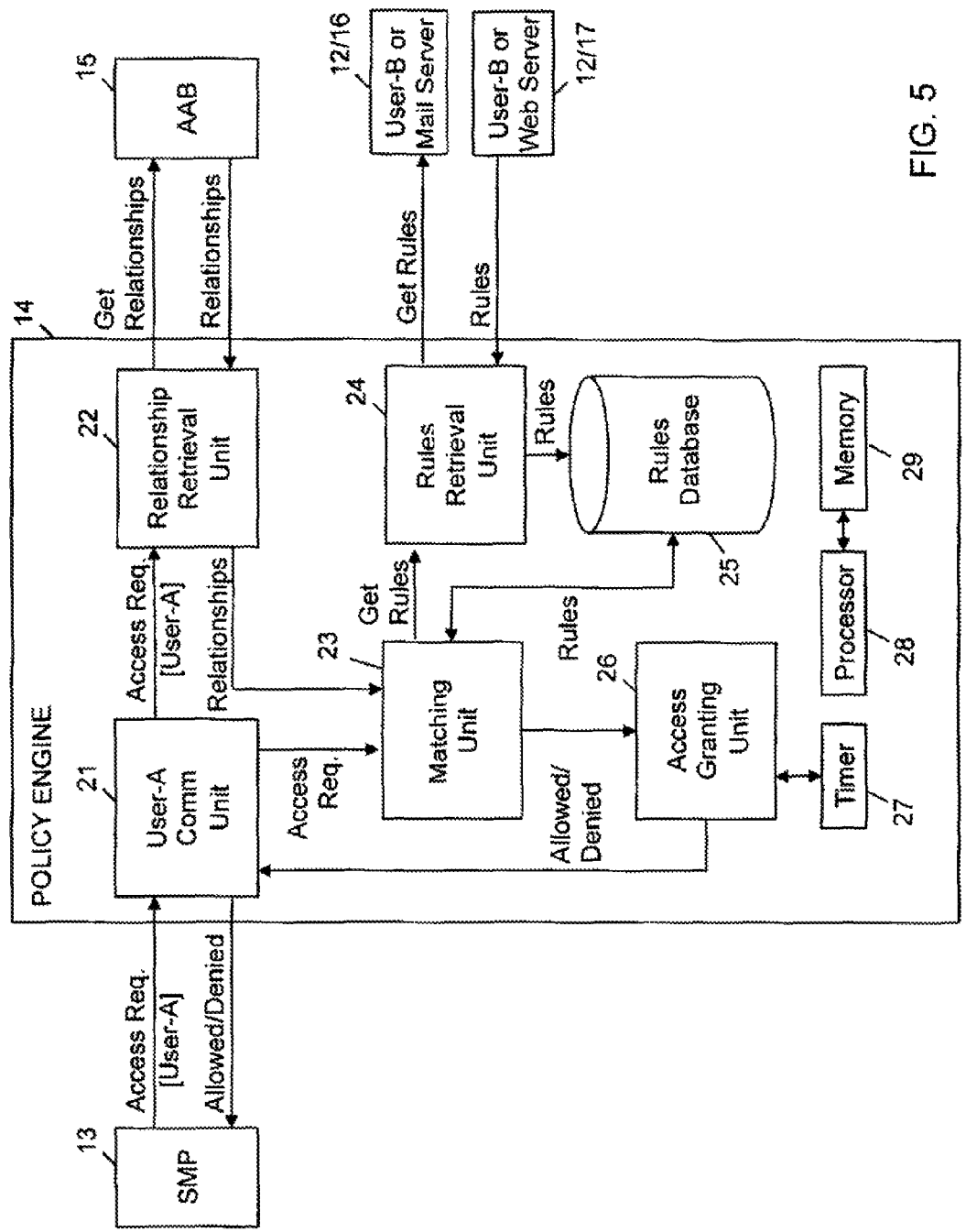
FIG. 5 is a simplified block diagram of an exemplary embodiment of a Policy Engine of the present invention.

FIG. 5 is a simplified block diagram of an exemplary embodiment of the Policy Engine 14 of the present invention. A User-A communication unit 21 receives the access request and passes it to a Relationship Retrieval Unit 22 and a Matching Unit 23. The Relationship Retrieval Unit retrieves the relationships between User-A and User-B from the AAB 15 and sends the relationships to the Matching Unit. The Matching Unit determines whether there are access rules that match the relationships. If not, the Matching Unit requests a Rules Retrieval Unit 24 to retrieve access rules from User-B. As noted above, this may be done directly with User-B if User-B is online, or through the Mail Server 16 if User-B is off line. The access rules are received either directly from User-B if User-B is online, or through the Web Server 17 when User-B logs on after being off line.

The Rules Retrieval Unit 24 stores the access rules in the Rules Database 26, and the Matching Unit 23 accesses them to determine if there are access rules matching the relationships. The Matching Unit sends a result to an Access Granting Unit 26 indicating whether there is an access rule matching the relationships. The Access Granting Unit may have access to a timer 27 for determining whether the time period specified in the access rule has expired. If the access rule allows access to the requested content, and the specified time period has not expired, the Access Granting Unit sends an "Allowed" indication to the User-A Communication Unit 21, which forwards the Allowed indication to the SMP 13. If there is no access rule matching the relationships, or the matching rule does not allow access to the requested content, or the matching rule has expired, the Access Granting Unit sends a "Denied" indication to the User-A Communication Unit 21, which forwards the Denied indication to the SMP 13.

The operation of the Policy Engine 14 may be controlled by a processor 28 executing computer program instructions stored on a memory 29. Alternatively, the Policy Engine may be implemented in hardware, firmware, or a combination of software, hardware, and firmware.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of granting a first user temporary, limited access to a second user's electronic content, the method comprising the steps of:
   receiving by a hardware processor controlling a Policy Engine, a request originating from the first user to access the second user's electronic content stored on a server, wherein the second user is distinct from the server;
   retrieving by the hardware processor controlling the Policy Engine from a relationship database, relationship information regarding a relationship between the first and second users;
   applying by the hardware processor controlling the Policy Engine, an access rule matching the relationship information, the access rule specifying a portion of the second user's electronic content and a period of time the portion of the second user's electronic content is available, wherein different access rules specify different portions of the second user's electronic content or different periods of time the portions of the second user's electronic content are available, depending on the relationship between the first and second users;

when the specified period of time has not expired, the hardware processor controlling the Policy Engine granting the first user access to only the specified portion of the second user's electronic content; and when the specified period of time has expired, the hardware processor controlling the Policy Engine denying the first user access to the specified portion of the second user's electronic content, and sending from the hardware processor controlling the Policy Engine to the second user, a notification that the first user attempted to access the second user's electronic content after the specified period of time expired;

wherein the first user has at least one identifiable characteristic, and the access rule also specifies that all users having the at least one identifiable characteristic can access the specified portion of the second user's electronic content during the specified period of time without requesting access from the second user.

2. The method as recited in claim 1, wherein the step of retrieving relationship information from a relationship database includes the hardware processor controlling the Policy Engine retrieving the relationship information from an internal database in the Policy Engine if an internal database exists, or from an Active Address Book (AAB) external to the Policy Engine, if an internal database does not exist.

3. The method as recited in claim 1, further comprising, before applying the access rule, the steps of:

determining by the hardware processor controlling the Policy Engine, whether an access rule matching the relationship information is stored within the Policy Engine; and when there is not an access rule matching the relationship information stored within the Policy Engine, the hardware processor obtaining the access rule from the second user.

4. The method as recited in claim 3, wherein the first and second users are online with a social media network, and the step of obtaining the access rule from the second user includes:

sending a request for the access rule from the hardware processor controlling the Policy Engine to the second user through the social media network; and receiving the access rule by the hardware processor from the second user through the social media network.

5. The method as recited in claim 3, wherein the first user requests access to the second user's electronic content through a social media network when the second user is not online with the social media network, and the step of obtaining the access rule from the second user includes:

sending from the hardware processor controlling the Policy Engine to the second user, an e-mail message requesting the access rule; and receiving the access rule by the hardware processor from the second user in an e-mail response message.

6. The method as recited in claim 1, further comprising sending from the hardware processor controlling the Policy Engine to the second user, a notification of the first user's access to the second user's electronic content during the specified period of time.

7. A Policy Engine for controlling access by a first user to a second user's electronic content, the Policy Engine comprising a control hardware processor for controlling a plurality of units, the units including:

a communication unit for receiving a request originating from the first user to access the second user's electronic content stored on a server, wherein the second user is distinct from the server;

a relationship retrieval unit for retrieving from a relationship database, relationship information regarding a relationship between the first and second users;

a matching unit for applying an access rule matching the relationship between the first and second users, the access rule specifying a portion of the second user's electronic content and a period of time the second user's electronic content is available, wherein different access rules specify different portions of the second user's electronic content or different periods of time the portions of the second user's electronic content are available, depending on the relationship between the first and second users; and a timer for determining whether the specified period of time has expired;

wherein when the specified period of time has not expired, the communication unit is configured to send a response toward the first user indicating that only the specified portion of the second user's electronic content is available to the first user; and wherein when the specified period of time has expired, the communication unit sends a response toward the first user indicating that the specified portion of the second user's electronic content is no longer available, and the communication unit sends to the second user, a notification that the first user attempted to access the second user's electronic content after the specified period of time expired;

wherein the first user has at least one identifiable characteristic, and the access rule also specifies that all users having the at least one identifiable characteristic can access the specified portion of the second user's electronic content during the specified period of time without requesting access from the second user.

8. The Policy Engine as recited in claim 7, wherein the relationship database is implemented in the Policy Engine.

9. The Policy Engine as recited in claim 7, wherein the relationship database is implemented in an Active Address Book (AAB) external to the Policy Engine, and the relationship retrieval unit includes means for retrieving the relationship information from the AAB.

10. The Policy Engine as recited in claim 7, further comprising:

a rules database for storing access rules, the rules database being accessible by the matching unit for determining whether an access rule matching the relationship information is stored within the rules database; and a rules retrieval unit for obtaining the access rule from the second user when there is not an access rule matching the relationship information stored within the rules database.

11. The Policy Engine as recited in claim 10, wherein when the first and second users are online with a social media network, the rules retrieval unit is configured to obtain the access rule from the second user through the social media network.

12. The Policy Engine as recited in claim 10, wherein when the first user requests access to the second user's electronic content through a social media network when the second user is not online with the social media network, the rules retrieval unit is configured to obtain the access rule from the second user through e-mail messaging.

13. The Policy Engine as recited in claim 7, wherein the communication unit is configured to send to the second user, a notification of the first user's access to the second user's electronic content during the specified period of time.

14. A system for controlling access by a first user to a second user's electronic social content, the system comprising:
- a Social Media Portal (SMP) for providing the first user with access to a social media network;
- a Policy Engine in communication with the SMP for storing and applying access rules for controlling access to electronic social content of a plurality of users; and
- an Active Address Book (AAB) in communication with the Policy Engine for storing relationship information regarding relationships between the plurality of users;
- wherein the SMP includes means for forwarding to the Policy Engine, a request originating from the first user to access the second user's electronic social content stored on a server in the social media network, wherein the second user is distinct from the server;
- wherein the Policy Engine includes a control hardware processor for controlling a plurality of units, the units including:
  - a relationship retrieval unit for retrieving from the AAB, relationship information regarding a relationship between the first and second users;
  - a matching unit for applying an access rule matching the relationship between the first and second users, the access rule specifying a portion of the second user's electronic content and a period of time the second user's electronic content is available, wherein different access rules specify different portions of the second user's electronic content or different periods of time the portions of the second user's electronic content are available, depending on the relationship between the first and second users;
  - a timer for determining whether the specified period of time has expired; and
  - a communication unit configured to:
    - send a response to the SMP allowing access when the matching rule grants access and the matching rule has not expired; and
    - send a response to the SMP denying access when there is no matching rule, when the matching rule does not allow access, or when the matching rule has expired, wherein the communication unit sends to the second user, a notification that the first user was denied access, and when the matching rule has expired, the communication unit is configured to send a response toward the first user indicating that the specified portion of the second user's electronic content is no longer available, and to send to the second user, a notification that the first user attempted to access the second user's electronic content after the matching rule expired; and
- wherein the first user has at least one identifiable characteristic, and the access rule also specifies that all users having the at least one identifiable characteristic can access the specified portion of the second user's electronic content during the specified period of time without requesting access from the second user.

15. The system as recited in claim 14, wherein the Policy Engine also includes means for obtaining an access rule from the second user when a matching rule is not stored in the Policy Engine.

\* \* \* \* \*

UNITED STATES PATENT AND TRADEMARK OFFICE
CERTIFICATE OF CORRECTION

| | | |
|---|---|---|
| PATENT NO. | : 8,931,034 B2 | Page 1 of 1 |
| APPLICATION NO. | : 12/823304 | |
| DATED | : January 6, 2015 | |
| INVENTOR(S) | : van Slingerland et al. | |

It is certified that error appears in the above-identified patent and that said Letters Patent is hereby corrected as shown below:

In the specification,

In Column 3, Line 65, delete "the MB," and insert -- the AAB, --, therefor.

In Column 4, Line 8, delete "the MB 15" and insert -- the AAB 15 --, therefor.

In Column 4, Line 65, delete "the MB 15" and insert -- the AAB 15 --, therefor.

In Column 5, Line 18, delete "access, content-X" and insert -- access content-X --, therefor.

In Column 5, Line 33, delete "the MB" and insert -- the AAB --, therefor.

Signed and Sealed this
Twenty-seventh Day of October, 2015

Michelle K. Lee
*Director of the United States Patent and Trademark Office*